United States Patent Office 3,145,881
Patented Aug. 25, 1964

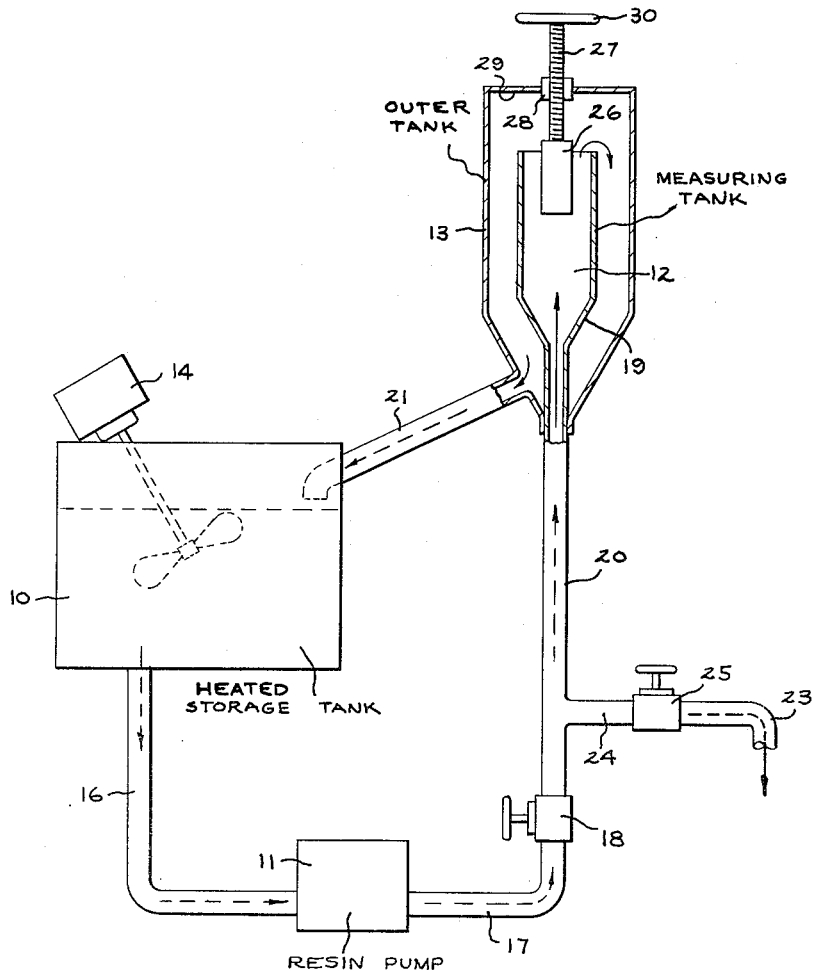

3,145,881
CONSTANT TEMPERATURE-CONSTANT
VOLUME MEASURING TANK
Fred W. Moore and Merle G. Lawson, Louisville, Ky., assignors to General Electric Company, a corporation of New York
Filed Mar. 4, 1963, Ser. No. 262,695
1 Claim. (Cl. 222—226)

The present invention relates to a method and apparatus for storing, measuring and then dispensing an epoxy resin formulation in measured batches at a predetermined elevated temperature and constant volume.

This invention was devised as a factory process during the development of a design of an electric motor being encapsulated with an epoxy resin, and constitutes a successful means for processing the resin at the point where the pigment is added, but prior to the time that the resin is mixed with fillers and the curing agents. There is a co-pending application on such an electric motor and the method of making same, application Serial No. 209,663 in the name of Marcus P. Hogue which was filed on July 13, 1962, entitled Encapsulated Motor for Waste Disposal Apparatus, which is assigned to the General Electric Company, the assignee of the present invention. A preferred formulation of molding compound utilizes the basic epoxy resin Bisphenol A and a mixture of aromatic amines (a-phenylenediamine and methylenedianilene). The use of this material not only gives a previously unattainable chemical resistance, serves as the motor housing, as a bearing support, and as the mechanical and chemical protective shield for the stator winding, but it also serves well as a heat sink for the heat generated by the motor windings.

One reason that epoxy resins have not been widely used heretofore is that suitable formulations are heavily filled with abrasive materials and they require rugged handling methods. After adequate mixing and de-aeration, the hardeners are added and the material mixed to a homogeneous consistency, all at elevated mixing temperatures. Many of the formulations have the consistency of soft clay or bread dough at room temperature, for this reason the dried fillers are added at elevated temperatures to the hot resin. Even then the consistency of the mixture is barely workable by hand.

The principal object of the present invention is to provide a method and apparatus for accurately measuring a given volume of epoxy resin formulation, while being able to hold the resin at a stable elevated temperature in order to have the resin available for subsequent mixing operations with suitable fillers.

A further object of the present invention is to provide a method of handling large batches of epoxy resin formulation by recirculating the resin between a heated storage tank and a measuring tank, thereby maintaining the resin in the measuring tank at a stable temperature and being able to drain off the resin from the measuring tank when needed.

Briefly stated, in accordance with one aspect of this invention, we provide both a method and the apparatus for practicing the method of supplying epoxy resin to a heated storage tank and of mixing the resin within the tank to avoid temperature differentials. The resin is continuously drawn from the storage tank and supplied to an elevated measuring tank, the resin being allowed to fill the measuring tank and the excess overflowing the top of the tank and being collected in an outer tank from which the resin is returned to the heated storage tank. The resin is caused to move continuously through this cycle, thereby stabilizing the temperature thereof. When it is necessary to dispense a given volume of the heated resin, the recirculation is stopped and the measuring tank is drained thereby serving as a source of epoxy resin of a given volume and heated to an elevated temperature which has all been found necessary in order to obtain reproducible results in the encapsulating process.

Our invention will be better understood from the following description taken in conjunction with the accompanying drawing and its scope will be pointed out in the appended claim.

The single figure of the drawing is a diagrammatic flow chart of a suitable apparatus for practicing the method of the present invention.

There are four main elements to the apparatus; namely, a heated storage tank 10, a resin pump 11 for continuously drawing the resin from the storage tank and supplying it to an elevated measuring tank 12, and finally an outer tank 13 for catching the overflow from the measuring tank 12 and for returning the resin to the storage tank 10. Starting back at the heated storage tank 10, it is a steam jacketed tank having a capacity of about 200 gallons that is used to store the epoxy resin. The resin is adapted to be raised to a temperature of above 150° F. and in order to avoid hot spots in the heated resin an agitator 14 is used in the tank to stir or mix the resin and stabilize this temperature. Means are provided for continuously removing the resin from the storage tank 10 and feeding it up through the bottom of the elevated measuring tank 12. Such means is exemplified by the pipe 16 extending out the bottom of the storage tank 10 and connected to the resin pump 11. Leading from the resin pump 11 is a pipe 17 which is provided with a main valve 18. Then there is a direct connection from the main valve 18 to the bottom portion 19 of the measuring tank 12 by means of a pipe 20. The measuring tank 12 is a tank that is open at the top to allow for an excess of resin to overflow at the top thereof and into an outer tank 13 which surrounds the measuring tank and is much larger thereover. This outer tank has a gravity flow pipe 21 which joins the bottom of the outer tank 13 with the heated storage tank 10, thereby completing the closed system for recirculating the epoxy resin from the heated storage tank through the measuring tank and outer tank back to the storage tank.

A discharge means for the system is exemplified by the outlet 23 which has a branch pipe 24 connected in the pipe 20 between the main valve 18 and the bottom 19 of the measuring tank 12. Located in this branch pipe 24 is a secondary valve 25 for purposes which will be explained hereinafter. During the normal operation of this system for raising the temperature of the epoxy resin to a predetermined stable temperature, the main valve 18 is open and the discharge valve 25 is closed. Accordingly, the movement of the resin in the flow chart will be in a counter-clockwise direction starting at the storage tank 10 and continuing through the pipe 16, resin pump 11 through the pipe 17 and main valve 18, up through the feed pipe 20 to the elevated measuring tank 12, where the resin flows upwardly through the tank until it overflows into the outer tank 13 and falls to the bottom thereof where it returns by gravity to the storage tank 10 through the pipe 21.

It will be understood that a continuous recirculation of the resin through this system will cause the temperature of the resin throughout the system to stabilize. The next problem is to devise a means for measuring accurately the volume of the resin so that a given volume may be dispensed from the discharge outlet 23. The measuring tank 12 is provided with an adjustable plunger 26 which is positioned in the top portion of the measuring tank 12 so that when it is raised or lowered, it varies the carrying capacity of the measuring tank. The plunger is fitted with an adjusting screw member 27 that is threaded through a suitable fitting 28 that is fastened within the closed top wall 29 of the outer tank 13. This adjusting screw 27 is fitted at its top with a turn-wheel 30 which must be manually turned in order to reposition the plunger 26. Accordingly, it is a trial and error task of obtaining the exact volumetric amount in the measuring tank. Once the measuring tank is calibrated then the plunger need no longer be moved. However, for the first several times that the apparatus will be put into operation the resin would be circulated through the system with the main valve 18 open and the discharge valve 25 closed and the plunger 26 positioned for example as shown in the drawing. Once the proper temperature of the resin has been reached, the resin pump 11 would be stopped and the main valve 18 would be closed and the discharge valve 25 would be opened. Then, the resin in the measuring tank 12 and in the portion of the feed pipe 20 that lies above the discharge valve 25 would be emptied by gravity and the material collected beneath the discharge outlet 23. This collected resin would be weighed and if the amount of resin were light, the plunger 26 would be adjusted upwardly to withdraw a portion of it from the measuring tank 12. An opposite adjustment would be necessary to lower the plunger 26 into the measuring tank 12 if the collected resin amounted to an excess amount.

Modifications of this invention will occur to those skilled in this art, therefore, it is to be understood that this invention is not limited to the particular embodiments disclosed but that it is intended to cover all modifications which are within the true spirit and scope of this invention as claimed. For example, the invention could be used whenever handling highly viscous fluids where the volume and temperature are critical factors to be controlled.

What we claim as new and desire to secure by Letters Patent of the United States is:

An apparatus for storing, measuring and dispensing an epoxy resin formulation and the like which comprises a heated storage tank that is adapted to receive the epoxy resin, agitator means within the storage tank to mix the resin so that it will maintain a generally uniform temperature throughout, pumping means for withdrawing the resin from the storage tank, and an elevated measuring tank having an inlet opening adjacent the bottom thereof for receiving the resin being delivered by the pumping means, the top of the measuring tank being open so that when the measuring tank is filled the excess resin will overflow, and an outer tank for receiving the overflow from the measuring tank, conduit means for returning the overflow resin to the storage tank to form a complete recirculating system, and a main valve means positioned between the pumping means and the measuring tank, and a second valve means positioned between the first valve means and the measuring tank, said second valve means being normally closed while the first valve means is open when the resin is recirculating through the system, the measuring tank being emptied by first stopping the pumping means, closing the first valve means and opening the second valve means, conduit means leading from the second valve means for emptying the resin located above the second valve means, and means to adjust the volume of said measuring tank including a plunger adapted to be inserted or withdrawn from said measuring tank whereby the effective volume of said measuring tank is diminished or increased by the volume of said plunger respectively inserted into or withdrawn from said measuring tank.

References Cited in the file of this patent

UNITED STATES PATENTS

| | | |
|---|---|---|
| 411,375 | Cooke | Sept. 17, 1889 |
| 1,733,635 | Stork | Oct. 29, 1929 |
| 1,808,117 | McLellan | June 2, 1931 |
| 1,815,875 | Muller | July 21, 1931 |
| 1,816,609 | Parker et al. | July 28, 1931 |
| 2,029,460 | Brady | Feb. 4, 1936 |
| 2,150,479 | Anderson | Mar. 14, 1939 |
| 2,537,266 | Granberg | Jan. 9, 1951 |
| 2,545,812 | Hosford | Mar. 20, 1951 |
| 2,877,929 | Ireland | Mar. 17, 1959 |
| 3,074,596 | Marchi | Jan. 22, 1963 |